Feb. 1, 1927.
E. W. COTTON
1,616,076
TIRE VULCANIZING APPARATUS
Original Filed Feb. 3, 1920    3 Sheets-Sheet 3
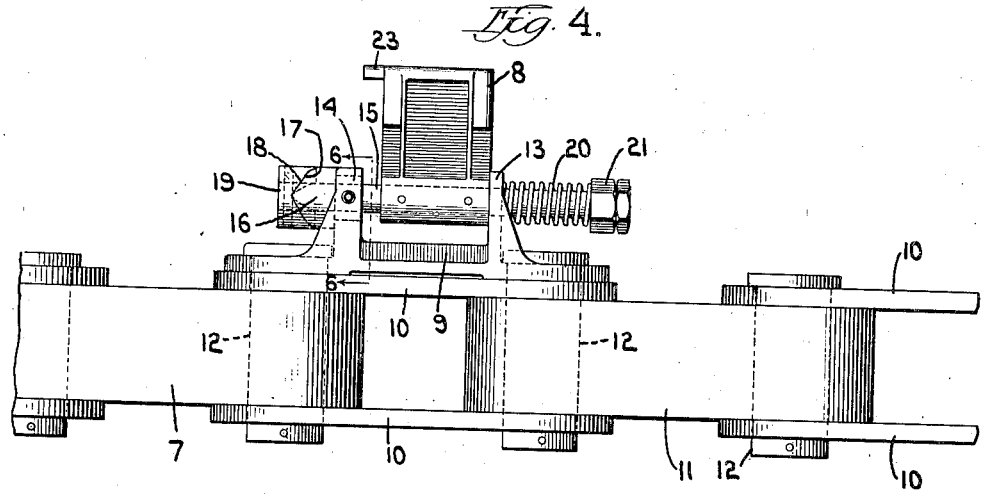
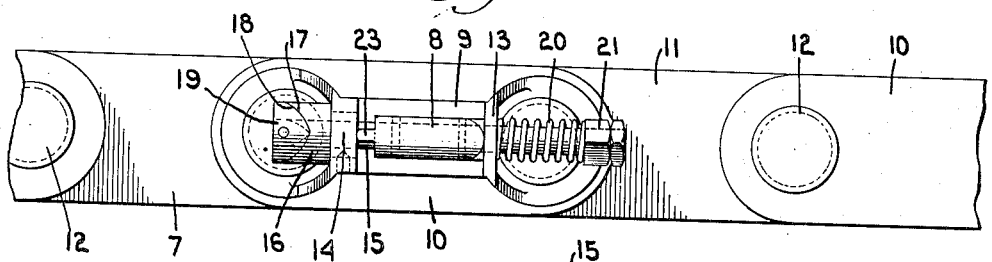
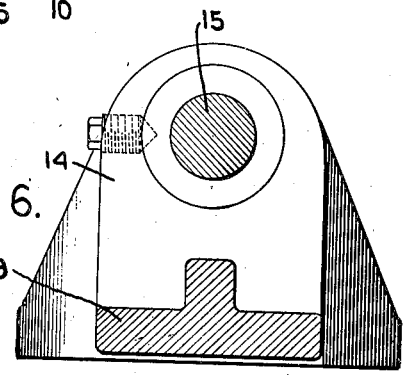
Witness:
Inventor:
Emmet W. Cotton Patented Feb. 1, 1927.

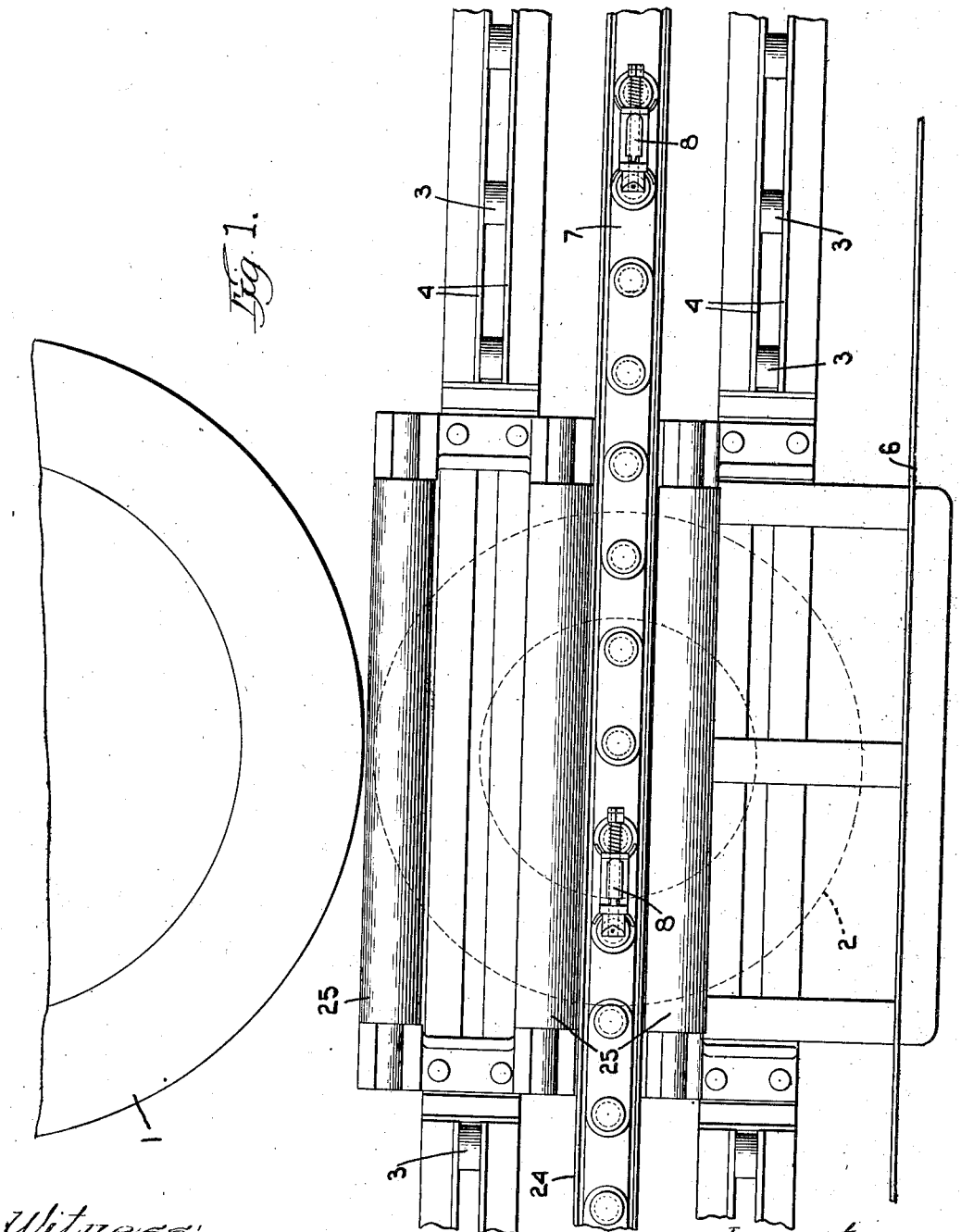

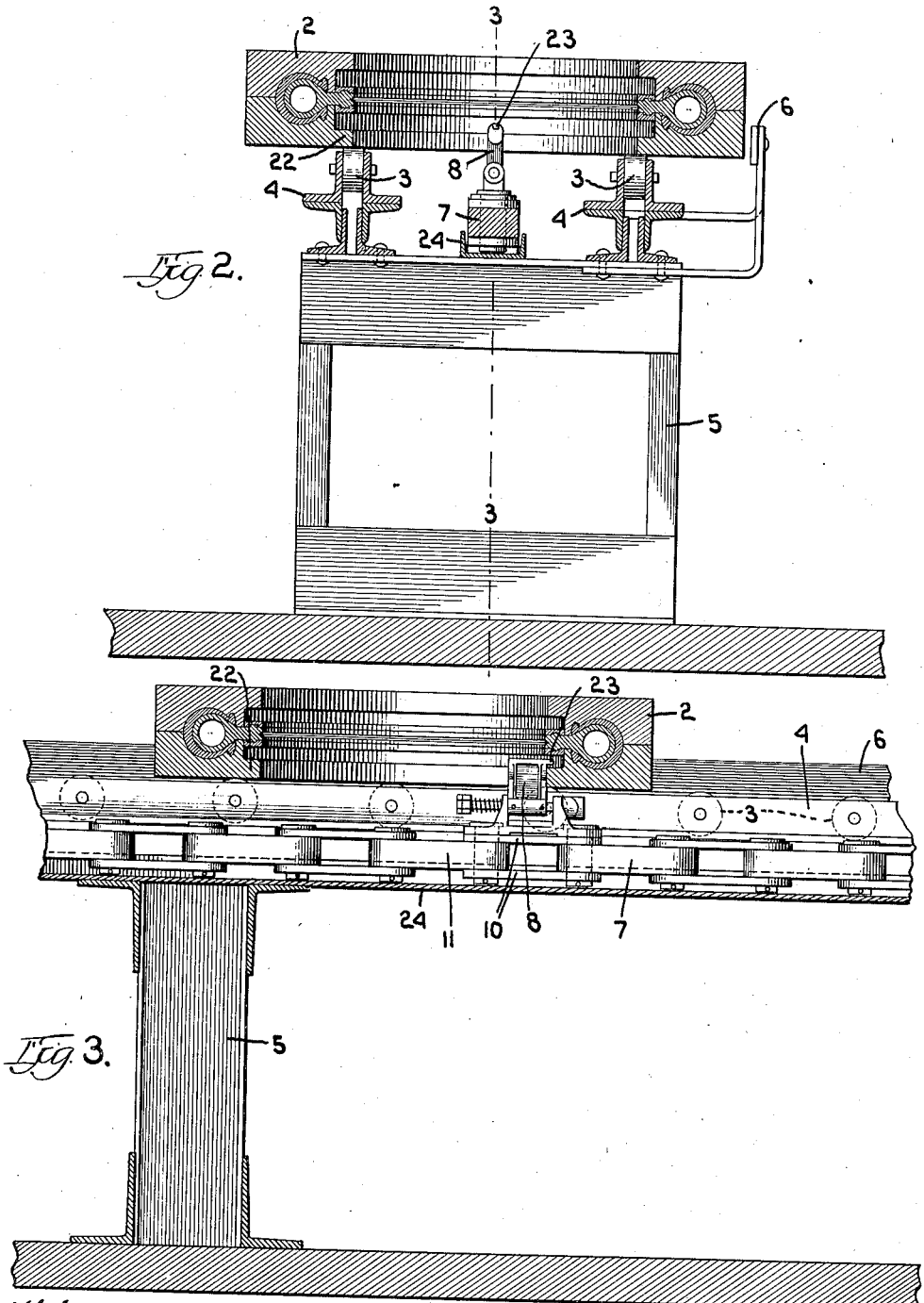

1,616,076

UNITED STATES PATENT OFFICE.

EMMETT W. COTTON, OF AKRON, OHIO, ASSIGNOR TO THE FIRESTONE TIRE AND RUBBER COMPANY, OF AKRON, OHIO, A CORPORATION OF OHIO.

TIRE-VULCANIZING APPARATUS.

Application filed February 3, 1920, Serial No. 356,036. Renewed February 14, 1923.

This invention relates to a conveyor system in combination with a series of vulcanizers and mold handling apparatus for use in factories making rubber tires, whereby the tire molds may be quickly and easily removed from the vulcanizers and other molds with uncured tires put into the vulcanizers. This invention relates particularly to a means whereby the molds are moved along and held in place in traveling around the apparatus. A roller means is also provided for facilitating the easy transfer of the molds to and from the vulcanizers.

The above and other objects of my invention will appear more fully in the accompanying description and be especially pointed out in the claims.

In the drawings:

Fig. 1 is a fragmentary plan view of the conveyor at the position of a vulcanizer, showing a mold in dotted lines and rollers for assisting in sliding the mold to and from the vulcanizer.

Fig. 2 is a cross sectional view of the conveyor showing a mold in place.

Fig. 3 is a longitudinal vertical sectional view taken on line 3—3, Fig. 2, showing a dog in engagement with one of the molds.

Fig. 4 is an enlarged side elevation of the endless chain showing a dog and dog carrier affixed in position.

Fig. 5 is a top plan view thereof.

Fig. 6 is a view taken on line 6—6, Fig. 4.

The apparatus comprises a series of vulcanizers or presses indicated at 1 (only one being shown). These presses may be of any style or make, the one indicated is of the vertical type of hydraulic press, the mold being compressed between the cover and the hydraulic ram, as is well known in the art.

The vulcanizers are preferably arranged in a straight line with the conveyor arranged to move in a horizontal path adjacent to the vulcanizers. The conveyor is of the endless type and it forms a loop at the ends of the presses, returning on the opposite side. On one side of the line of presses molds containing cured tires are removed from the vulcanizers and molds with uncured tires are slid into the vulcanizers. On the opposite side of the tires are removed from the molds, the molds cleaned and fresh tires to be cured placed in the molds. The conveyor is moving constantly and there is provided a sufficient number of these presses so that one will always be filling with uncured tires and another one will be discharging cured tires.

The molds 2 are pulled along by the conveyor over rollers 3 mounted in the tracks 4 that run parallel on both sides of the conveyor member. These tracks are shown in Fig. 2 as being made up of angle irons and being secured to the standard 5 that serves to support the conveyor apparatus at the desired height from the floor.

Running around the outside of the conveyor apparatus is a guard rail 6 that also acts as a guide rail for the molds should they tend to slide or be pushed off the track. This rail in front of the vulcanizers is intended to act as an abutment for the molds as they are slid from the presses, preventing them from sliding too far so as to fall off.

The conveyor element is indicated at 7 as being an endless chain made up of links 10 and 11 held together by pins 12. This chain is driven in any preferred manner and travels around the series of vulcanizers. It is guided in and supported by a channel piece 24 that runs directly under the chain. This channel is secured to the top of the standards 5.

Mounted at equal intervals on the upper side of the links of the conveyor are the projections or dogs that engage the molds. As shown in Figs. 4 and 5 the dog 8 is pivotally mounted in a bracket 9, the bracket being secured to the link 10 by means of the link connecting studs 12. Upstanding from the bracket are two lugs 13 and 14 in which a pivotal shaft 15 is supported. The dog 8 is pinned to the shaft 15. The projection 14 is constructed with a laterally extending boss 16, having a cam surface 17 that engages a complementary cam surface 18 on a collar 19. The collar 19 is pinned to one end of the shaft 15. A helical spring 20 is placed on the opposite end of the shaft and is compressed between the projection 13 and the adjusting nuts 21. The spring 20 serves to keep the collar 19 in contact with the boss 16, and the cam surfaces are so designed that they normally keep the dog 8 in a vertical position and restore it to such a position if it is tilted to one side or the other.

These dogs have to be made yieldable so the molds may be slid on and off the conveyor, but on account of the spring acting on the cams 17 and 18 the dog, when released, springs back to its vertical position, and during the movement of the conveyor they engage the molds and move them around the track.

As shown in Figs. 2 and 3, the molds 2 are constructed with an internal annular flange 22. At the top on the front of the dog there is formed a nose projection 23 which is adapted to overlie the flange 22 when the dog is in engagement with the mold. This nose, or lug, 23 tends to hold the mold down in place and it assists in holding down the lower mold half when the upper half of the mold is lifted to remove the tires.

Mounted on the conveyor in front of each vulcanizer on the side where the molds are loaded or removed from the vulcanizer is a series of horizontal rollers 25 running longitudinally with the conveyor. When the molds are brought to their positions, they rest on the rollers 25. The mold, when brought in position opposite the vulcanizer, may be slid or rolled into the vulcanizer without any great exertion. Upon removal of the molds from the vulcanizers the rollers assist the operator. They afford a means whereby the molds can be slid to and from the vulcanizers in a straight path and are not apt to be tilted to one side, such as is not uncommon in the use of castors that have been used heretofore.

The operation of the apparatus will be readily understood from the foregoing. The type of dog shown herein furnishes an efficient means for holding the molds and for drawing them over the track, which is strong and not easily gotten out of order.

The molds are carried around on the conveyor through a succession of steps in which the mold is opened by lifting the top half, the tire and core which have been vulcanized are removed, a fresh unvulcanized tire and core are placed in the mold and the mold closed. These operations are all performed while the conveyor is moving continuously. The movement of the conveyor brings the molds around to a point opposite an open vulcanizer, and each mold is moved forward slightly by the operator and then moved laterally into the vulcanizer, the rolls 25 allowing the easy movement of the mold. It may be remarked, at this point, that the rollers 3 terminate at either side of the vulcanizer so that they do not interfere with the lateral movement of the mold.

As the mold moves laterally over the rolls, the side of the dog is struck by the inner edge of the mold and is depressed.

When a vulcanizer is being emptied, the molds are drawn over the rollers 25 and on to the conveyor, the dog being depressed by the outer edge of the mold, but rising on the inside of the mold, the onward movement of the conveyor picking up the mold and carrying it to the opening and unloading station.

The action of the dog will be evident from an inspection of the figures, it being understood that the spring 20 acting against the nuts 21 will hold the shaft 15 to the right (Fig. 4) whereby the boss 16 and the collar 19 are mated and the dog is upright. When the dog is depressed the two mating portions of the dog and boss are forced out of position, the space between the two lugs permitting the shaft to move longitudinally.

It will be understood, however, that various changes in the details of construction and arrangement and combination of parts can be made without departing from the scope of my invention.

I claim:

1. In a device of the character described, a vulcanizer, a chain movable past said vulcanizer, a plurality of rollers arranged with their axes parallel to the chain and located between the chain and the vulcanizer, and a projection on the chain adapted to engage a mold.

2. In a device of the character described, a vulcanizer, a chain movable past said vulcanizer, a roller arranged with its axis parallel to the chain and located between the chain and the vulcanizer, and a projection pivoted on said chain and movable so as to be entirely below the surface of the roller.

3. In a device of the character described, a vulcanizer, a chain movable past said vulcanizer, a roller arranged with its axis parallel to the chain and located between the chain and the vulcanizer, a projection pivoted on said chain and movable so as to be entirely below the surface of the roller and yielding means to hold said projection in upright position.

4. A vulcanizing apparatus for vulcanizing tires comprising a vulcanizer, a conveyor alongside said vulcanizer, said conveyor comprising a moving chain, a projection on said chain to engage the molds, a plurality of rollers arranged in parallel rows at the sides of said chain to support the molds and permit them to move over the conveyor, rolls arranged opposite the vulcanizer to permit the mold to be removed laterally of the conveyor and yielding means to hold said projection normally in upright position.

5. An apparatus for vulcanizing tires, comprising a vertical vulcanizer, a conveyor at the side of said vulcanizer, a normally vertical projection on said conveyor to engage a mold, and a lug extending from the projection over the mold to hold the mold on the conveyor.

6. An apparatus for vulcanizing tires comprising a vertical vulcanizer, a conveyor at the side of said vulcanizer, a normally vertical projection on said conveyor to engage the mold, and a lug extending from the projection over the mold to hold the mold on the conveyor, and yielding means to hold said projection normally in upright position.

7. In an apparatus for vulcanizing tires, the combination of a vulcanizer, a conveyor at the side of the vulcanizer, a guard rail along the conveyor on the side opposite the vulcanizer, means on the conveyor to engage the mold and a plurality of rolls between the rail and the vulcanizer over which the molds can be moved.

8. In an apparatus for vulcanizing tires, the combination of a vulcanizer, a conveyor at the side of the vulcanizer, a guard rail along the conveyor on the side opposite the vulcanizer, means on the conveyor to engage the mold and a plurality of rolls between the rail and the vulcanizer over which the molds can be moved, and a depressible dog on said conveyor, normally in upright position to engage the molds thereon.

9. In an apparatus for handling annular articles, a conveyor chain, a yielding projection on said chain, said projection being depressible below the surface of the conveyor in a direction at an angle to the travel thereof.

10. In an apparatus for handling annular articles, a conveyor chain, a yielding projection on said chain, said projection being depressible below the surface of the conveyor in a direction at an angle to the travel thereof, and means on the said projection to engage the inner circumference of the article.

11. In an apparatus for handling annular articles, such as tire molds, comprising a conveyor chain, rollers parallel to the chain to facilitate transverse movement of the articles to and from the conveyor, and a depressible projection on said chain adapted to engage the inner circumference of the article.

12. In an apparatus for handling annular articles, such as tire molds, comprising a conveyor chain, rollers parallel to the chain to facilitate transverse movement of the articles to and from the conveyor, a depressible projection on said chain adapted to engage the inner circumference of the article and yielding means to hold said projection above the surface of the rollers.

13. In an apparatus for handling annular articles, a longitudinally moving conveyor, a plurality of rollers arranged parallel to the conveyor, means projecting upwardly from the conveyor to engage the inner circumference of the articles, said means being mounted on the conveyor so as to be depressible below the surface thereof.

14. In an apparatus for conveying annular articles, such as tire molds, a longitudinally moving chain, a plurality of rollers arranged along said chain to facilitate longitudinal travel of the articles, and a number of rollers parallel to the line of travel of the conveyor arranged at intervals along the conveyor.

15. In an apparatus for conveying annular articles, such as tire molds, a longitudinally moving chain, a plurality of rollers arranged along said chain to facilitate longitudinal travel of the articles, a number of rollers parallel to the line of travel of the conveyor arranged at intervals along the conveyor and a mold engaging member on said conveyor projecting above the surface thereof, and depressible below the surface of said parallel rollers.

16. In an apparatus for handling tire molds, a longitudinally movable conveyor chain, a pivoted projection above the surface of the chain, normally in upright position, but movable in either direction transversely to the chain.

17. In an apparatus for handling tire molds, a longitudinally movable conveyor chain, a rotatable shaft mounted on said chain, a projection secured to said shaft, spring means normally holding said shaft with the projection upright upon said chain, but permitting rocking movement of the shaft in either direction.

18. In an apparatus for moving annular tire molds in a horizontal plane, a conveyor member, a projection extending upwardly from said member adapted to engage the inner circumference of the mold, and means supporting the projection whereby it is adapted to yield in a direction at an angle to the travel thereof.

19. In an apparatus for moving annular tire molds in a horizontal plane, a conveyor member, a projection extending upwardly from said member adapted to engage the inner circumference of the mold, and means permitting depression of the projection by shifting of the mold transversely on the conveyor.

20. In an apparatus for moving annular tire molds, means for supporting the molds, a conveyor chain below said supporting means, a yielding projecting device attached to said chain and extending above the supporting means and a mounting for said device permitting its depression below the supporting means in a direction at an angle to the travel of the conveyor chain.

21. In an apparatus for moving annular tire molds, means for supporting the molds, a conveyor chain below said supporting means, a projecting device attached to said chain and extending above the supporting means, a mounting for said device permitting its depression below the supporting means and yielding means normally holding said projection above the surface of the supporting means.

22. In an apparatus for conveying annular articles such as tire molds, the combination of two spaced tracks adapted to support the weight of the articles, a movable chain between the tracks, a dog on said chain having a pivot arranged parallel to the line of movement of the chain, and means to hold the dog in upright position but adapted to yield to permit the dog to be depressed below the level of the tracks.

23. A conveyor comprising a movable chain, a rock shaft on the chain, an article engaging projection on the rock shaft, a stationary cam on the chain, a cam on the shaft cooperating with the first said cam, and a spring on the shaft acting to hold the two cams in their normal position but permitting the shaft to rotate.

24. A conveyor comprising a movable chain, a rock shaft on said chain, an article engaging projection on the rock shaft, and cam and spring devices to hold the projection in upright position but permitting rocking movement thereof transversely of the line of travel of the chain.

EMMETT W. COTTON.